(12) United States Patent
Ang et al.

(10) Patent No.: US 10,113,871 B2
(45) Date of Patent: Oct. 30, 2018

(54) SURVEYING POLE

(71) Applicant: LEICA GEOSYSTEMS AG, Heerbrugg (CH)

(72) Inventors: Siang Chien Ang, Johor Bahru (MY); Xi Dong Shawn Ge, Singapore (SG); Zhen Huang, Singapore (SG); Jian Peng Pan, Singapore (SG)

(73) Assignee: LEICA GEOSYSTEMS AG, Heerbrugg (CH)

( * ) Notice: Subject to any disclaimer, the term of this patent is extended or adjusted under 35 U.S.C. 154(b) by 249 days.

(21) Appl. No.: 15/256,383

(22) Filed: Sep. 2, 2016

(65) Prior Publication Data
US 2017/0067740 A1    Mar. 9, 2017

(30) Foreign Application Priority Data

Sep. 4, 2015   (EP) .................................... 15183972

(51) Int. Cl.
*G01C 15/06*    (2006.01)

(52) U.S. Cl.
CPC .................................... *G01C 15/06* (2013.01)

(58) Field of Classification Search
CPC ........................................................ G01C 15/06
USPC ............................................................ 33/296
See application file for complete search history.

(56) References Cited

U.S. PATENT DOCUMENTS

| | | | | |
|---|---|---|---|---|
| 6,502,321 | B1 * | 1/2003 | Crain .................... | G01C 15/06 33/293 |
| 6,688,012 | B1 * | 2/2004 | Crain .................... | G01C 15/06 33/295 |
| 7,373,725 | B1 | 5/2008 | Vanneman et al. | |
| 7,788,815 | B2 | 9/2010 | Yandrick et al. | |
| 8,230,609 | B1 * | 7/2012 | Sanders ................. | G01C 15/00 33/293 |
| 9,322,654 | B2 * | 4/2016 | Bockem ............... | G01C 15/002 |

(Continued)

FOREIGN PATENT DOCUMENTS

| CN | 103119396 A | 5/2013 |
|---|---|---|
| CN | 204064297 U | 12/2014 |

(Continued)

OTHER PUBLICATIONS

European Search Report dated Mar. 18, 2016 as received in Application No. 15183972.7.

*Primary Examiner* — Yaritza Guadalupe
(74) *Attorney, Agent, or Firm* — Maschoff Brennan

(57) ABSTRACT

Some embodiments of the invention relate to a surveying pole comprising: at least two pole sections being telescopically insertable into each other so that a height adjustment of the pole is provided, a pointing tip at the lower end of the pole for setting the pole on a terrain point, a position giving means arranged on the pole, a height measuring system for measuring the height of the position giving means relative to the terrain point, wherein the height measuring system comprises a magneto-strictive wire placed inside of the pole, a magnet interacting with the wire, the positioning of the magnet relative to the wire being linked to the height adjustment of the pole, a sensor circuitry for emitting current pulses through the wire, a signal transducer, and a decoder for evaluating the signals and the current pulses, and therewith deriving the height of the position giving means.

15 Claims, 2 Drawing Sheets

(56) References Cited

U.S. PATENT DOCUMENTS

| | | | |
|---|---|---|---|
| 9,341,473 B2 | 5/2016 | Zogg et al. | |
| 9,377,298 B2 * | 6/2016 | Zogg | G01C 15/002 |
| 9,541,392 B2 * | 1/2017 | Dusha | G01C 15/06 |
| 2008/0256812 A1 | 10/2008 | Yandrick | |
| 2009/0267827 A1 * | 10/2009 | Allison | G01C 15/00 |
| | | | 342/357.27 |
| 2017/0067740 A1 * | 3/2017 | Ang | G01C 15/06 |

FOREIGN PATENT DOCUMENTS

| | | |
|---|---|---|
| EP | 1 130 355 A2 | 9/2001 |
| JP | 2000-234933 A | 8/2000 |

* cited by examiner

SURVEYING POLE

FIELD OF THE INVENTION

The invention relates to a surveying pole for measuring the position of a point on the ground with the help of a geodetic instrument.

BACKGROUND

The use of congeneric surveying poles for staking out and measuring terrain points or similar devices are known from prior art, for example from U.S. Pat. No. 7,788,815 B2, EP 1 130 355 A2 or JP 2000 234933 A. In survey applications using TPS or GNSS equipment, a position measurement is not taken of the target point directly, but rather of a reflector, a receiver or an antenna on the surveying pole. A conclusion to the position of the target point is possible due to the known spatial relationship between the reflector, the receiver or antenna, and the tip of the pole. With this method it is possible to circumvent obstacles which stand in the direct way between the measuring instrument and the target point.

To provide further flexibility for such obstacles avoidance, usual practice is the realization of a pole adjustable in its height. Said surveying pole is typically used together with a geodetic device comprising a measuring light sender and a measuring light receiver. For example, the measuring light source (such as a rotating laser device) can emit a plane of light that defines a reference plane at a known elevation, wherein the reference plane may be level or sloping. When light of the plane incide into a reflector coupled to the surveying pole and configured to be moved up and down the pole, the light is sent back to and detected by the geodetic instrument. As the geodetic instrument and the surveying pole are wirelessly connected with each other in order to communicate, the pole can be given an indication by the geodetic instrument, when visual contact has been obtained. From that, the pole can give notice to its user by an audible, vibratory and/or visual signal.

Survey pole solutions comprising a GNSS antenna are not reliant on a terrestrial geodetic instrument as they obtain their positional data via a satellite positioning system. However, to increase measurement accuracy, a GNSS reference station might be provided at the scene. In traditional surveying with a GNSS-pole the surveyor places the pole tip onto the measuring point, levels the pole and triggers the GNSS measurement, the results of which include also height information.

As for the height measurement of the pole adjusted in the described way, current solutions are either manual reading from a tape measure or automatic measurements with a measurement system based on the surveying pole. Conventional, i.e. analogue, surveying poles typically have visual measurement markers (such as a scale and numbers) printed on the pole or on a tape attached to the pole, which makes them operate like an ordinary measuring tape. For this purpose, the poles have a telescopic structure which provides the height adjustability and the measurability by shifting the scale according to the height adjustment.

Other solutions, such as offered in U.S. Pat. No. 7,373,725, provide automatic height measurement using electronic appliances, wherein a reference indicator and a grade-rod reference surface indicating absolute height marks are used for the height detection. Differences in electromagnetic coupling are detected with help of the incremental inductive path detection. Derived from this are a relative movement and a height measurement resorting to this relative distance travelled Height measuring solutions for surveying poles known from prior art have several common disadvantages. As surveying jobs are subject to a high expenditure of time, known surveying poles do not meet the needed time efficiency requirements, as a high share of manual steps is necessary. Also due to manual steps, common surveying poles allow for too many sources of error caused by the user.

SUMMARY

Some embodiments of the invention include an improved surveying pole for measuring the position of a measuring point on the ground, wherein the pole is particularly improved in accuracy, reliability and usability.

Some embodiments of the invention include a surveying pole that comprises at least two pole sections being telescopically insertable into each other so that a height adjustment of the pole is provided, a pointing tip at the lower end of the pole for setting the pole on a terrain point, a position giving means arranged on the pole, a height measuring system for measuring the height of the position giving means relative to the terrain point, wherein the height measuring system comprises a magneto-strictive wire placed inside of the pole, a magnet interacting with the wire, the positioning of the magnet relative to the wire being linked to the height adjustment of the pole, a sensor circuitry for emitting current pulses through the wire, a signal transducer, in particular comprising a sensing coil, for transforming mechanical waves of the wire into electrical signals, and a decoder for evaluating the signals and the current pulses, and therewith deriving the height of the position giving means. The magnet is arranged surrounding the sensor wire and particularly has a toroidal shape.

The position giving means thereby comprise a reflector cooperating with a geodetic instrument, and/or a GNSS antenna.

The pole can further comprise an inertial measuring unit with a defined spatial position relative to the pointing tip, wherein the inertial measuring unit comprises IMU-sensors including accelerometers and gyroscopes.

In a further embodiment, the pole comprises a wireless communication means, such as a Bluetooth or radio device by way of example, for transmitting and receiving information between the pole and a receiving device, the receiving device particularly being a geodetic instrument. Hereby, the information can be particularly at least one of the following: height information acquired by the height measuring system of the pole, tilting information acquired by the inertial measuring unit, and position information acquired by the GNSS antenna and/or by a geodetic instrument with means of the reflector. As an alternative to a wireless communication means, a wired communication means could also be used for transmitting and receiving information between the pole and a receiving device.

The pole may comprise a controller unit for controlling, feeding and reading the wireless communication means, storing the height information, particularly in combination with the tilting information and/or the position information, and making said information retrievable by the user.

The controller unit may have an alert functionality which is capable of creating a warning signal after recognizing an unusual height adjustment, particularly an abrupt adjustment and/or an abnormally large adjustment.

Electric power supply means, particularly a battery unit, can be stored in a housing, which is attached to the pole, wherein the electric power supply means is exchangeable.

According to the invention a surveying pole is provided with an automatic height measuring functionality for position giving means, wherein the height measurement is performed based on magneto-strictive sensor technology. The position giving means—e.g. a GNSS receiver or a retro-reflector for use with a total station—are placed on the body of the survey pole with a defined spatial relation to the tip. This spatial relation is variable due to the adjustability of the pole and measurable with means of the automatic height measuring functionality.

The pole comprises at least two pole sections (rods or tubes) which are telescopically insertable into each other so that a height adjustment of the pole is provided.

A magneto-strictive wire sensor is placed inside the pole and serves as a waveguide. Such wire sensor is made by copper, by way of example. The sensor is positioned in such a way that its axis is parallel or coaxial to the pole's long axis (i.e. the axis of the pole's rods). Furthermore, the sensor is—at least in part—surrounded by a magnet, preferably a permanent ring-magnet, whereby magnet and sensor are mounted within the pole such that they are moveably relative to each other. This relative mobility is provided in the direction of the pole's long axis and is coupled directly, or reduced by gearing, with the height adjustment of the pole.

In one embodiment of the invention, the magneto-strictive wire sensor is fixedly mounted relative to a first pole section, the first pole section comprising a pointing tip for setting the pole on a terrain point, and comprising a grip for handling the pole. A second pole section is telescopically joined with the first pole section, and further pole sections might be joined accordingly. One of the further (other than the first) pole sections carries the position giving means and comprises the magnet encompassing the wire sensor in a contactless way.

In other embodiments of the invention, the magneto-strictive wire sensor can be fixedly mounted relative to any one of the further (other than the first) pole sections, which preferably carries the position giving means. In these other embodiments, the magnet is fixedly located in the first pole section.

In said embodiments the height adjustment of the pole with means of moving the pole sections relative to each other causes the wire sensor on the one hand and the magnet on the other hand to also move relative to each other in a known ratio.

The sensor circuitry emits pulses of current through its wire, generating a circular magnetic field. The magnet magnetizes the wire axially with its magnetic field and as both magnetic fields (the one of the sensor and the one of the magnet) are superimposed, a torsion wave is generated by the relative movement of said components. The torsion wave travels in both directions along the wire. One of the torsion waves runs directly to the sensor end comprising a signal transducer, while the other one is reflected at the end of the wire sensor. The wire sensor, hence, works as a waveguide. The time between emission of the current pulse and the arrival of the wave at the signal transducer is measured. Therefore, an absolute metering of the position of the magnet is taking place by means of time measurement of the wave travel within the sensor wire.

Due to its absoluteness, a calibration of this measuring system is not required. While at the same time providing a high accuracy of up to 1 μm, the surveying pole according to the invention is resistant to shocks up to 100 G, usable in a broad range of temperature and water-resistant according to IP68.

The signal transducer of the wire sensor can be embodied as a sensing coil wrapped around the magneto-strictive wire.

The signals sensed by the coil are sent to a filter and an amplifier from which a micro controller unit (MCU) can process the signals to length information.

As the sensor wire needs to be so long that the magnet is still surrounding the wire in the longest extracting position of the pole, it protrudes at least one of the pole sections for such a long length, that it is preferably supported by a spacer at an adequate position, the spacer being made from a synthetic material not disturbing the magnetic field.

In one embodiment of the invention, the pole comprises its power supply, such as customary batteries, is housed on the pole, preferably in a housing also comprising the power indicator, the MCU, a display for showing the current height and buttons for setup, all components being linked by a PCBA (printed circuit board assembly).

In another embodiment of the invention, the pole comprises an inertial measuring unit (IMU) for additionally measuring a current tilt of the pole. The IMU has a defined spatial position relative to the pointing tip and comprises IMU-sensors like accelerometers and gyroscopes.

In further embodiment of the invention, the pole comprises a motorization for the pole sections, whose control is supported by the height measuring system and/or the controller unit, the controller unit particularly having a user interface for entering a desired height of the pole.

BRIEF DESCRIPTION OF THE DRAWINGS

In the following, the invention will be described in detail by referring to exemplary embodiments that are accompanied by figures, in which.

DETAILED DESCRIPTION

Figure 1:
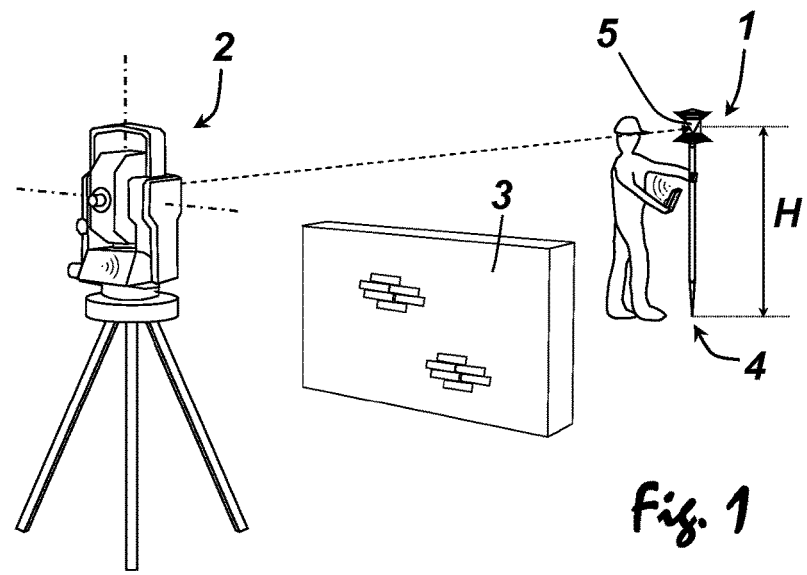
FIG. 1: an exemplary measuring task for the inventive surveying pole.

FIG. 1 shows a typical surveying scene where a measurement is taken with a geodetic instrument 2 and a surveying pole 1. In this scenario, an obstacle 3 is blocking the direct visual contact between the measuring device 2 and the target point 4 on the ground. A height H can be measured by the surveying pole, in the very moment a spatial measurement of the reflector 5 has been taken by the geodetic instrument 2. For example by means of wireless communication, instrument 2 and pole 1 are designed to exchange information about measurement time, measurement values (height information), measurement results, etc.

Figure 2A:
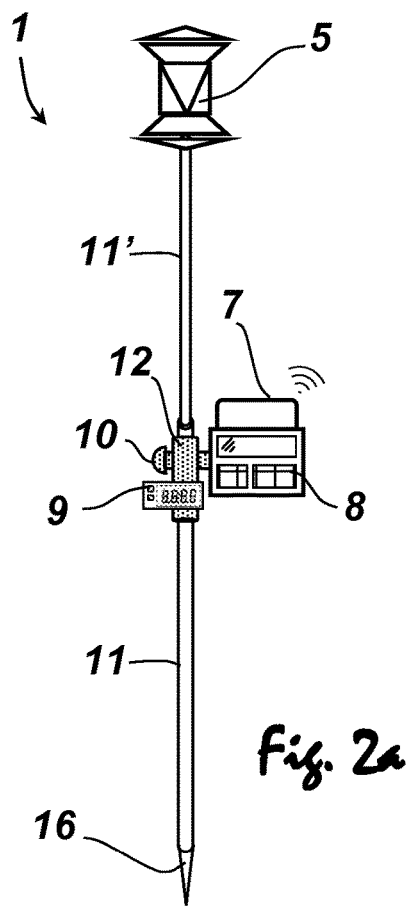
FIG. 2a,b: embodiments of the inventive surveying pole comprising a controller unit and a position giving means.
Figure 2B:
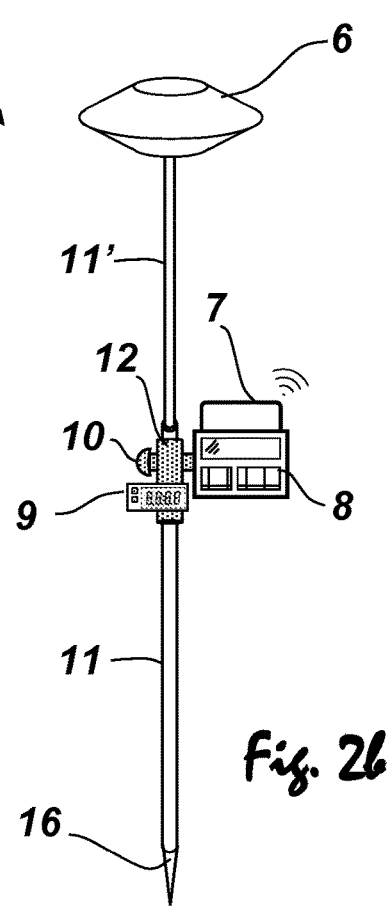

FIGS. 2a and 2b show in more details the build-up of the surveying pole 1, whereby the position giving means can be a reflector 5 (FIG. 2a) or a GNSS antenna 6 (FIG. 2b), by way of example. The surveying pole 1 comprises wireless communication means 7 which is connected with a controller unit 8. Alternatively, also a tablet or a smartphone can be attached to the pole for undertaking the function of a controller and also the function of a wireless communication means. Optionally, the pole 1 can further comprise a displaying instrument 9 for directly outputting the height information and functionalities like immediate height difference calculations or the like, what the displaying instrument 9 also can provide buttons for. The pin 16 at the lower end of the pole is a positioning and pointing help.

The rod system of the pole 1 comprises at least two pole sections 11 and 11'-further pole sections $11^x$ (not shown) accordingly inserted can optionally be provided. A fixation means 10 can fixate the telescopic pole sections so that their positioning relative to each other is fixed. Also, the slide mechanism can be design such that a friction force is sufficient to hold the height of the pole and a fixation means is not necessary.

The grip 12 may serve as a carrier for fixation means 10, displaying instrument 9, controller 8 and/or wireless communication means 7. Fixation of the height adjustment may, however, also be done by an alternative functionality, such as a snap lock fixation.

Figure 3:
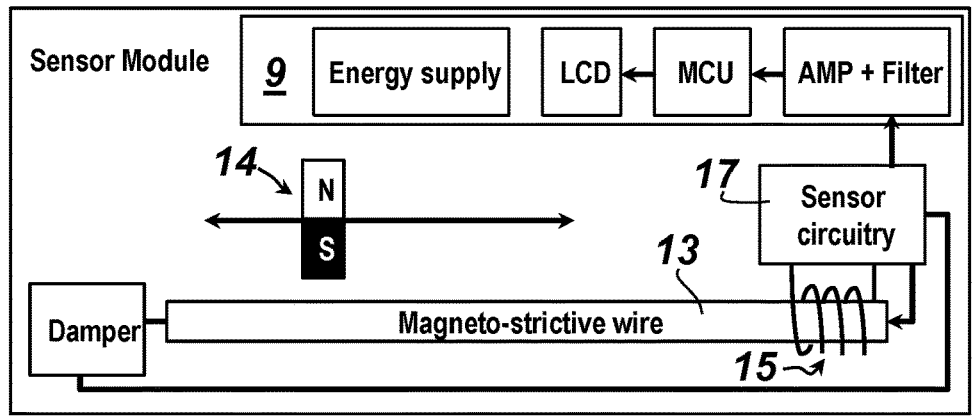
FIG. 3: schematic overview of components involved in the height measuring system according to the invention.

FIG. 3 shows a schematic overview of components involved in the height measuring system (sensor module) according to the invention. The displaying instrument 9 may by way of example comprise: an energy supply unit, a display (LCD), an amplifier (AMP) and filter, and a control unit (MCU), whereby the amplifier, filter and the MCU can be concluded as a decoder. The decoder thereby is fed with sensed signals collected by the signal transducer (sensing coil) 15 embracing the magneto-strictive wire 13, as well as with the times of the initial current stimulations (pulse emissions) conducted by the sensor circuitry 17. The signals are prompted by the "echoes" of the current pulse emissions. The MCU calculates a travel time between sending out the initial pulses of current and the receiving of the signals, from which a distance correlating to the momentary absolute position of the magnet 14 can be derived. Due to the current pulse, Magnet 14 interacts with the magnetic field of the wire 13 and reflects a mechanical wave in the wire 13, which then can be sensed by the sensor coil 15.

Figure 4:
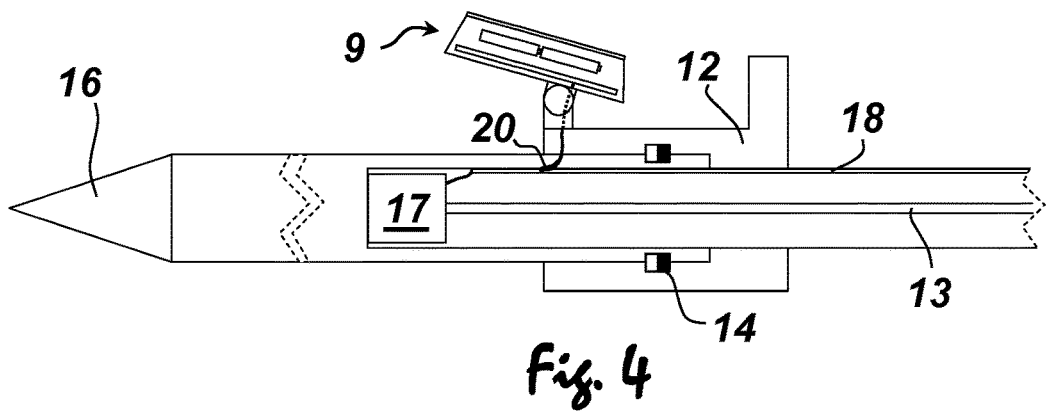
FIG. 4: an embodiment of the height measuring system according to the invention.
Figure 5:
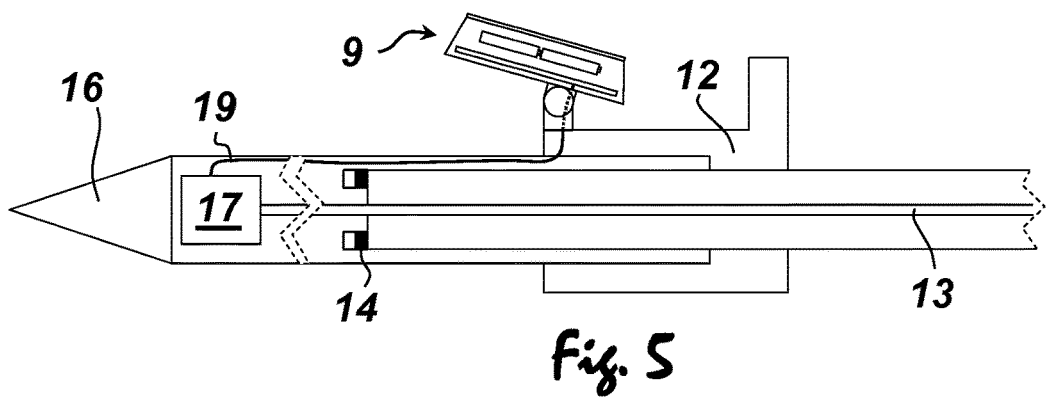
FIG. 5: another embodiment of the height measuring system according to the invention.

FIG. 4 and FIG. 5 show specific embodiments of the sensor module arrangement. In FIG. 4 an arrangement is shown, in which the magnet 14 is fixed relative to the lower pole section (which comprises the tip 16 and the grip 12), and FIG. 5 shows an arrangement, in which the magnet 14 is movable relative to the lower pole section according to the height adjustment of the pole.

In either case, the relative movement between magnet 14 and wire 13 is directly or indirectly linked to the height adjustment of the pole.

In FIG. 4, contact between the displaying instrument 9 and the sensor circuitry 17 can be established via a contact bar 18 which is sensed by a brush 20 in order to transmit electrical signals, as the upper pole section comprising the sensor circuitry 17 is a moving part. As FIG. 5 shows, this can also be solved with a FFC (flexible flat cable) 19.

Although the invention is illustrated above, partly with reference to some preferred embodiments, it must be understood that numerous modifications and combinations of different features of the embodiments can be made. All of these modifications lie within the scope of the appended claims.

What is claimed is:
1. A surveying pole comprising:
   at least two pole sections being telescopically insertable into each other so that a height adjustment of the pole is provided;
   a pointing tip at the lower end of the pole for setting the pole on a terrain point,
   a position giving means arranged on the pole; and
   a height measuring system for measuring the height of the position giving means relative to the terrain point, the height measuring system comprises:
   a magneto-strictive wire placed inside of the pole;
   a magnet interacting with the wire, the positioning of the magnet relative to the wire being linked to the height adjustment of the pole;
   a sensor circuitry for emitting current pulses through the wire;
   a signal transducer, in particular comprising a sensing coil, for transforming mechanical waves of the wire into electrical signals; and
   a decoder for evaluating the signals and the current pulses, and therewith deriving the height of the position giving means.

2. The surveying pole according to claim 1, the position giving means comprising a reflector cooperating with a geodetic instrument.

3. The surveying pole according to claim 1, the position giving means comprising a GNSS antenna.

4. The surveying pole according to claim 1, wherein the pole further comprises an inertial measuring unit with a defined spatial position relative to the pointing tip, wherein the inertial measuring unit comprises IMU-sensors including accelerometers and gyroscopes.

5. The surveying pole according to claim 1, further comprising communication means for transmitting and receiving information between the pole and a receiving device, the receiving device particularly being a geodetic instrument.

6. The surveying pole according to claim 1, wherein the information being at least one of the following:
   height information acquired by the height measuring system of the pole,
   orientation information, particularly acquired by a compass,
   tilting information, particularly acquired by the inertial measuring unit, and
   position information acquired by the GNSS antenna with means of the reflector.

7. The surveying pole according to claim 1, wherein the information being at least one of the following:
   height information acquired by the height measuring system of the pole,
   orientation information, particularly acquired by a compass,
   tilting information, particularly acquired by the inertial measuring unit, and
   position information acquired by a geodetic instrument with means of the reflector.

8. The surveying pole according to claim 1, wherein the magnet is arranged surrounding the sensor wire and particularly has a toroidal shape.

9. The surveying pole according to claim 1, further comprising a controller configured to
   control, feeding and reading the wireless communication means,
   store the height information, particularly in combination with the position information, and
   make said information retrievable.

10. The surveying pole according to claim 9, further comprising a motorization for the pole sections, whose control is supported by the height measuring device.

11. The surveying pole according to claim 9, further comprising a motorization for the pole sections, whose control is supported by the controller unit, the controller unit particularly having a user interface for entering a desired height of the pole.

12. The surveying pole according to claim 9, wherein the controller unit having an alert functionality which is capable of creating a warning signal after recognizing an unusual height adjustment, particularly an abnormally large adjustment.

13. The surveying pole according to claim 9, wherein the controller unit having an alert functionality which is capable of creating a warning signal after recognizing an unusual height adjustment, particularly an abrupt adjustment.

14. The surveying pole according to claim 1, further comprising a controller configured to
    control, feeding and reading the wireless communication means,
    store the height information, particularly in combination with the tilting information, and
    make said information retrievable.

15. The surveying pole according to claim 1, wherein an electric power supply means, particularly a battery unit, in a housing, the housing being attached to the pole, wherein the electric power supply means is exchangeable.

* * * * *